R. B. ROBINSON.
VELOCIPEDE.
APPLICATION FILED JAN. 17, 1908.
906,293.
Patented Dec. 8, 1908.
2 SHEETS—SHEET 1.
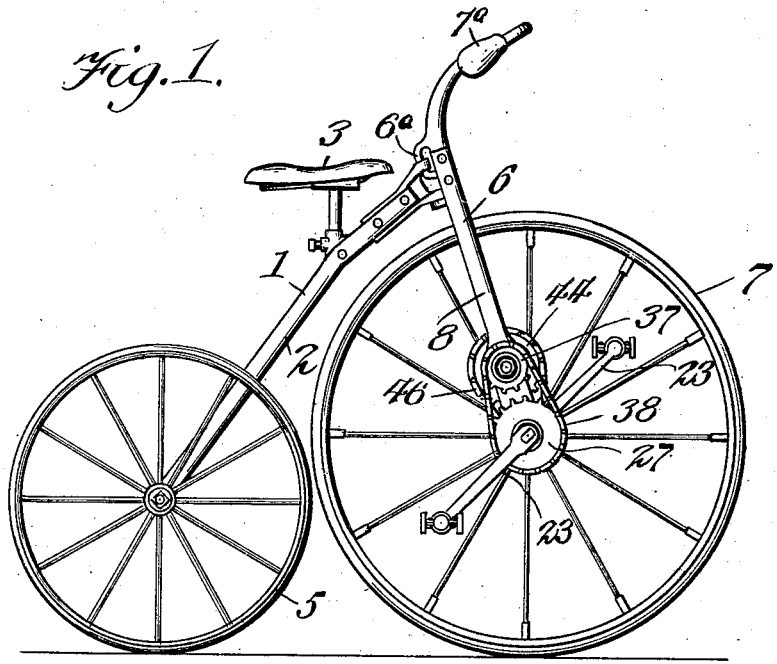
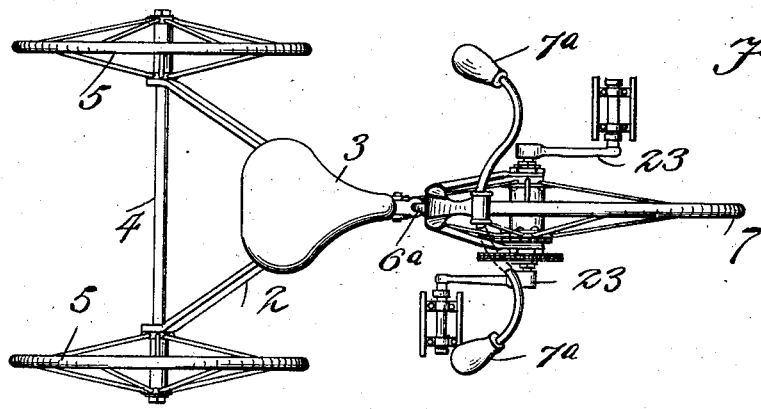
WITNESSES:
INVENTOR.
Robert B. Robinson
BY
Victor J. Evans,
ATTORNEY.

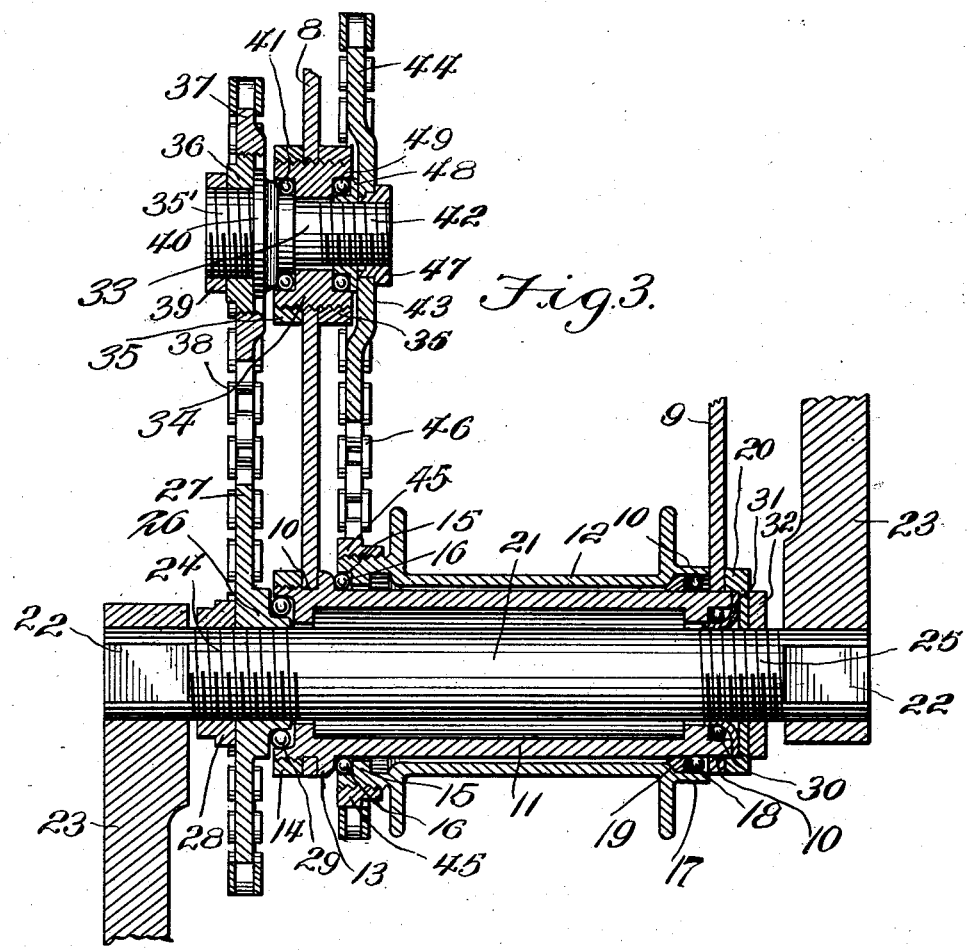

UNITED STATES PATENT OFFICE.

ROBERT B. ROBINSON, OF KANSAS CITY, MISSOURI.

VELOCIPEDE.

No. 906,293.  Specification of Letters Patent.  Patented Dec. 8, 1908.

Application filed January 17, 1908. Serial No. 411,361.

*To all whom it may concern:*

Be it known that I, ROBERT B. ROBINSON, a citizen of the United States, residing at Kansas City, in the county of Jackson and State of Missouri, have invented new and useful Improvements in Velocipedes, of which the following is a specification.

This invention relates to drive gearing for vehicles of the type particularly designed to be manually-propelled, but which may also be motor-propelled, such as velocipedes, bicycles and tricycles, the main object of the invention being to provide a drive gearing whereby high speed may be secured, and which is simple of construction, durable and efficient in operation, and of a compact character.

The invention consists of the features of construction, combination and arrangement of parts hereinafter fully described and claimed, reference being had to the accompanying drawing, in which:—

Figure 1 is a side elevation of a velocipede embodying my invention. Fig. 2 is a top plan view thereof. Fig. 3 is a vertical transverse section on an enlarged scale through the wheel hub and frame and the parts of the drive gearing.

Referring to the drawing, the numeral 1 designates the frame of a velocipede or other similar vehicle, upon the rear portion 2 of which is mounted a seat 3, the said rear portion being forked to support the axle 4 carrying the rear wheels 5. The front portion 6 of the frame is pivotally connected with the rear portion 2 in any suitable manner, as shown at 6$^a$, and upon said portion 6 is mounted the front propelling and steering wheel 7 and the handle bars 7$^a$, through the medium of which latter such front frame portion and the wheel 7 may be turned in one direction or the other for steering the vehicle. The lower portion of the frame section 6 is divided to form a fork, the arms 8 and 9 of which are disposed in parallel relation and provided at their lower ends with openings 10 for the reception of the ends of a crank hanger tube 11. The hub 12 of the wheel 7 is loosely mounted for rotation upon the crank hanger and is relatively shorter than the same. On one end of the hanger is an annular shoulder 13 which bears against the inner side of the arm 8, and such end of the hanger is externally threaded to receive a clamping ring 14, whereby the shoulder 13 is drawn against the arm 8 and the end of the hanger clamped to the arm. The inner face of the shoulder 13 is beveled to form a cone, while the adjacent end of the hub 12 is formed to provide a cup 15 in which is disposed a series of bearing balls 16 which turn in contact with said cone. The opposite end of the hub 12 is formed to provide a cup 17 in which is a series of bearing balls 18 turning in contact with a removable cone ring or washer 19, said balls being retained in the cup by the frame arm 9. A cap 20 closes the end of the hanger adjacent the bearings 18 and bears upon the outer surface of the arm 9, which retains the hub 12 from endwise movement in that direction. It will be seen from the foregoing description that upon removing the cap 20 and the ring 14 the hanger may be withdrawn longitudinally through the opening in the arm 9, thus permitting convenient disassemblage of the parts of the front wheel, the bearings and the drive gearing, as hereinafter described, when the driving shaft is detached.

Extending through the hanger 11 is the crank or driving shaft 21 having angular end portions 22 upon which pedal cranks 23 are fitted and keyed or otherwise secured. The respective ends of the shaft are threaded, as indicated at 24 and 25, the threaded portion 24 receiving the threaded hub 26 of a sprocket wheel 27 and a nut 28 to secure the same in position, the inner face of the hub 26 forming a cone, between which and the adjacent cup-shaped end of the hanger is arranged a series of bearing balls 29. The opposite end of the hanger is cupped to receive bearing balls 30 confined in position by a retainer 31, held in place by the cap 20, which in turn is clamped by a nut 32 upon the threaded portion 25 of the shaft. The cranks are detachably keyed or otherwise secured upon the ends of the shaft and provided with pedals of any preferred construction, and from the construction described it will be apparent by reference to Fig. 3 that the movable parts are adapted to have free action through the arrangement of the antifriction bearings, and may be applied and removed in an obvious manner.

A countershaft or power transmitting shaft 33 extends through a bearing sleeve or bushing 34 mounted upon the frame arm 8 above the hanger 11, said sleeve or bushing being externally threaded to receive threaded clamping rings 35 bearing against opposite sides of the arm to clamp the bushing firmly thereto, the arm being formed with a transverse opening through which the bushing extends. One end of the shaft 33 is threaded, as at 35', for the reception of a threaded hub 36 of a sprocket pinion 37, which sprocket pinion is in the form of a toothed ring threaded on the head and connected by a sprocket chain 38 with the gear 27 on the crank shaft 21. The hub 36 is secured in position by a threaded clamping ring 39 and bears at its inner side against a cone 40, formed on the shaft 33 between which and the adjacent end of the bushing 34 turns a series of bearing balls 41 arranged in a raceway formed in the bushing. The opposite or inner end of the shaft 33 is threaded, as at 42, to receive the hub 43 of a sprocket wheel 44, which is connected with a sprocket rim 45 on the wheel hub 12 by a chain 46. The hub 43 is secured upon the shaft through the medium of a hollow nut 47, which clamps said hub against a retaining ring 48 carried by the shaft, between which ring and the adjacent end of the bushing is disposed a series of bearing balls 49, turning in a raceway formed by the retaining ring and a cavity or recess in the bushing.

It will be apparent from the foregoing description that when motion is communicated to the crank shaft 21 through the pedal cranks 23, the shaft 33 will be driven through the chain connection 38 between the gear 27 and pinion 37, and that in turn motion will be communicated from the shaft 33 to the wheel 7 through the medium of the gear 44, pinion 45 and connecting drive chain 46. Hence power will be transmitted on direct lines on opposite sides of the frame arm 8 from the crank shaft to the wheel hub, the construction and arrangement of the gearing multiplying the speed so that the wheel will be revolved at a much more rapid rate than the shaft, thus permitting high speed to be secured with a comparatively slow motion of the pedal cranks. It will be seen that the gearing through which this result is secured is comparatively simple of construction and so mounted as to secure strength and durability, and that it is also compact and adapted to secure ease of motion through the reduction of friction to a minimum degree.

Having thus fully described the invention, what is claimed as new is:—

A vehicle embodying a frame having a forked portion providing supporting arms, one having an opening therein, a hanger extending between and carried by said arms, a crank shaft journaled in the hanger, a propelling wheel having its hub revolubly mounted upon the hanger between the arms, a removable bearing sleeve or bushing extending transversely through the said opening in one of the supporting arms above the hanger and beyond the opposite sides of said arm, threaded clamping rings engaging the oppositely projecting ends of the bushing and bearing against the opposite sides of said arm to clamp said bushing, sprocket wheels on the crank shaft and countershaft on the outer side of said supporting arm, sprocket wheels on the hub and countershaft on the inner side of said arm, and chains connecting the inner and outer sets of sprocket wheels.

In testimony whereof I affix my signature in presence of two witnesses.

ROBERT B. ROBINSON.

Witnesses:
  H. C. LANDERS,
  JAMES HOWARD.